United States Patent [19]

Janson

[11] Patent Number: 4,637,324
[45] Date of Patent: Jan. 20, 1987

[54] FURNITURE ASSEMBLY AND ASSEMBLY DEVICE

[76] Inventor: Richard W. Janson, Box 6090, Canton, Ohio 44706

[21] Appl. No.: 296,789

[22] Filed: Aug. 27, 1981

[51] Int. Cl.$^4$ .......................... A47B 3/06; A47B 13/02
[52] U.S. Cl. ...................................... 108/111; 108/64; 108/101; 108/114; 312/257 SK
[58] Field of Search ................. 108/111, 101, 64, 114; 312/257 SK, 263; 403/175, 178, 231, 338, 335, 331

[56] References Cited

U.S. PATENT DOCUMENTS

| | | | |
|---|---|---|---|
| 1,401,057 | 12/1921 | Elliott | 108/101 |
| 1,940,091 | 12/1933 | Kapp | 108/111 |
| 2,146,112 | 2/1939 | Erickson | 108/101 |
| 2,752,215 | 6/1956 | Peiss | 403/335 |
| 2,956,705 | 10/1960 | Clingman | 312/257 SK |
| 3,091,487 | 5/1963 | Gallagher et al. | 108/64 |
| 3,955,510 | 5/1976 | Kinik et al. | 108/111 |
| 4,126,364 | 11/1978 | Reilly | 312/257 SK |

FOREIGN PATENT DOCUMENTS 487942 12/1953 Italy ..................................... 403/338

Primary Examiner—Kenneth J. Dorner
Assistant Examiner—Mark W. Binder
Attorney, Agent, or Firm—Penrose Lucas Albright

[57] ABSTRACT

An article combined with other parts which assemble into an item of furniture, the article constituting a spacer of extruded aluminum having a cylindrical bore therethrough and, as seen in cross-section, grooves outboard of such bore which are right angles to each other. Bores of aligned spacers receive posts and outboard legs therein define grooves which receive vertical panels with horizontal members between spacers, such horizontal members having openings which are aligned with the bores to receive vertical pipe. The vertical pipe thereby aligns the spacers, horizontal members and indirectly the vertical members. In one embodiment, L-shaped portions formed in the extruded spaces opposite the legs define further grooves which permit the use of connecting clips between adjacent shelves. Additional spacers having further grooves to provide midway and central aligned supports for larger shelves are also disclosed.

6 Claims, 14 Drawing Figures

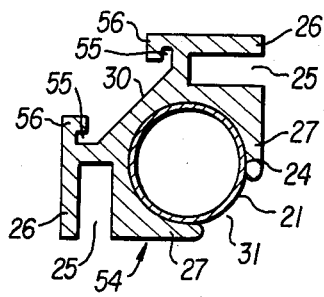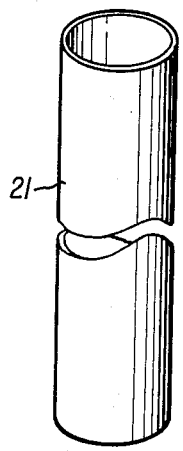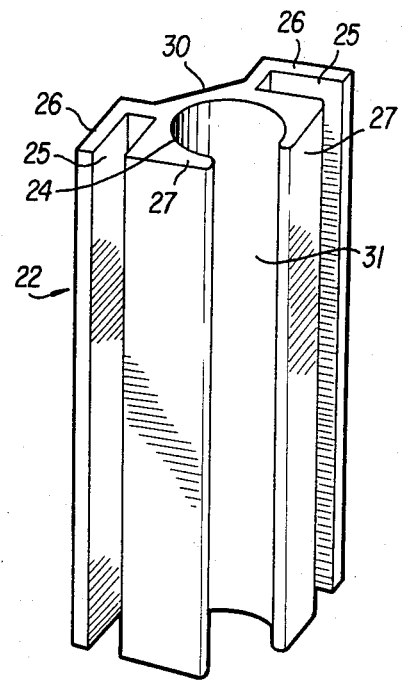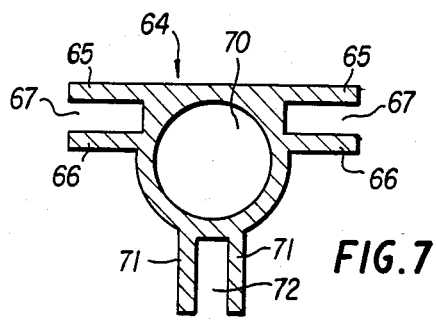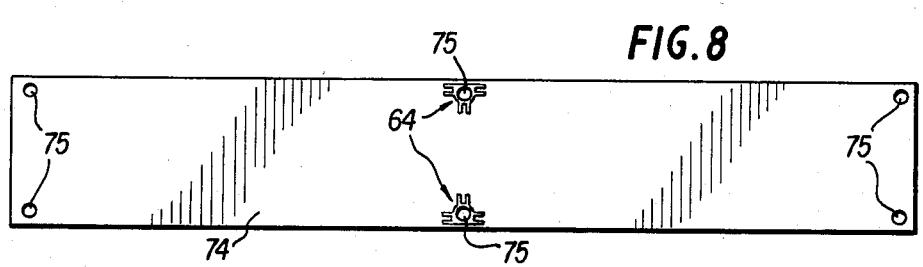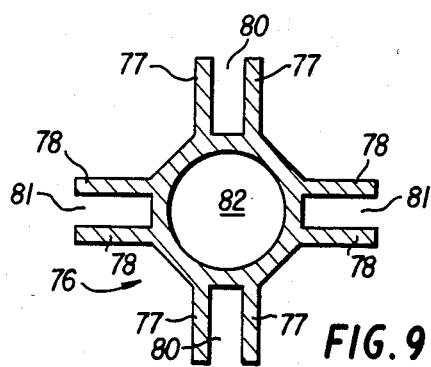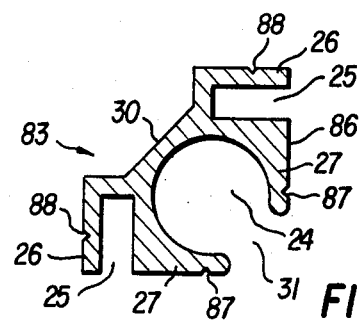

FURNITURE ASSEMBLY AND ASSEMBLY DEVICE

BACKGROUND OF THE INVENTION

The invention relates to an assembly device for assembling elements which will constitute shelving and other furniture as well as to the assemblies obtained by using such devices.

Various types of knock-down furniture which can be shipped compactly in a disassembled state to be assembled at a subsequent location have long been known.

Much furniture is a combination of post or rods and flat, coplanar components such as shelving. In prior art furniture of the type involved, the rods or posts are generally grooved and receive further specially adapted parts connected to the flat components for securing same in place. Examples of such types of knock-down furniture may be found in the following U.S. Pat. Nos.: 3,181,923 of May 4, 1965 to Guillon et al; 3,250,584 of May 10, 1966 to Tassell; 3,259,079 of July 5, 1966 to Freeman; 3,525,560 of Aug. 25, 1970 to Gasner et al; 3,661,434 of May 9, 1972 to Alster; 3,747,965 of July 24, 1973 TO WING; 3,734,032 to Gay 22, 1973 to Kovalik, 3,747,885 of July 24, 1973 to Ciancimino; 3,896,743 of July 29, 1975 to Pariente; 3,898,939 of Aug. 12, 1975 to Grachten; 4,021,128 of May 3, 1977 to Chiames; and 4,094,417 of June 13, 1978 to Cairnes et al.

Furniture designs utilizing systems of the above-identified patents are diverse and comprehensive. However, in each instant the user is generally limited to assembling the specific furniture. Modifications, adaptations and repair at the site wherein the furniture is assembled, if desired, usually require the use of special tools and skills or are otherwise time-consuming.

It is also known in the construction of knock-down furniture to use poles or posts with surrounding spacers to assemble shelving. An example of this type of construction may be found in the display rack of Elliott, U.S. Pat. No. 1,401,057, issued Dec. 20, 1921. With such construction, the dimensions of the shelving and the spacing between shelves can be easily modified, repaired or replaced at the site where the shelving is assembled. But, although such system is adaptable for various types of shelving, it is much less so to produce other furniture wherein the coplanar components are other than horizontal.

SUMMARY OF THE INVENTION

The invention is directed to a spacer for supporting a horizontal platform or other horizontal component comprising an aluminum extrusion which defines in its cross-section a circular opening to receive a hollow post or pipe having a one inch overall diameter and two grooves, disposed at right angles to each other located outboard of the circle, for receiving vertical panels. The extrusion is cut into a plurality of spacers of desired length whereby a vertical post through several such spacers divided by a plurality of horizontal platforms having aligned openings receive the vertical posts. The extrusions thus provide support and spacing as desired for the horizontal platforms in a manner similar to that taught by Elliott, supra. However, in addition, the vertical grooves position vertical panels which may provide additional support for the horizontal members.

Although the horizontal platforms, vertical panels, posts or pipes and the extrusions may, if desired, be pre-cut and delivered for assembly for a specific item of furniture, the only component of the assembly which is not readily available in most areas from a lumberyard or hardware store is the extrusion. Thus, furniture constructed in accordance with the invention can be repaired or modified by use of only a saw and drill and without the need of a cabinet maker's skills.

The invention thus involves and provides durable, inexpensive furniture capable of being shipped in a knocked-down condition which is suitable for rapid assembly upon arrival at the location. The components of the invention and particularly the spacer device permit the assembly of elements for a broad range of structures which will constitute almost any type of furniture such as shelving, cupboards, bookcases, beds, chairs, armchairs, etc.

Other objects, adaptabilities and capabilities of the invention will be understood by those skilled in the art as the description progresses, reference being had to the accompanying drawings in which:

BRIEF DESCRIPTION OF THE DRAWINGS

FIG. 3 is a sectional view of a spacer and pipe as shown in FIG. 2;

FIG. 4 is a detailed view of a pipe as shown in FIGS. 2 and 3;

FIG. 5 is a perspective view of a further embodiment of a spacer in accordance with the invention;

FIG. 6 is a sectional view of a clip which may be used with the spacer of FIG. 3 as shown in FIG. 2;

FIG. 7 is a sectional view of a midway spacer for shelves which may be used in the invention;

FIG. 8 is a plan view of a shelf illustrating use of the midway spacer shown in FIG. 7;

FIG. 9 is a sectional view of a central spacer for larger width shelves which may be used in the invention;

FIG. 11 is a cross-sectional view of a modified spacer similar to the spacers shown in FIGS. 2 and 3;

DESCRIPTION OF THE PREFERRED EMBODIMENTS

Figure 1:
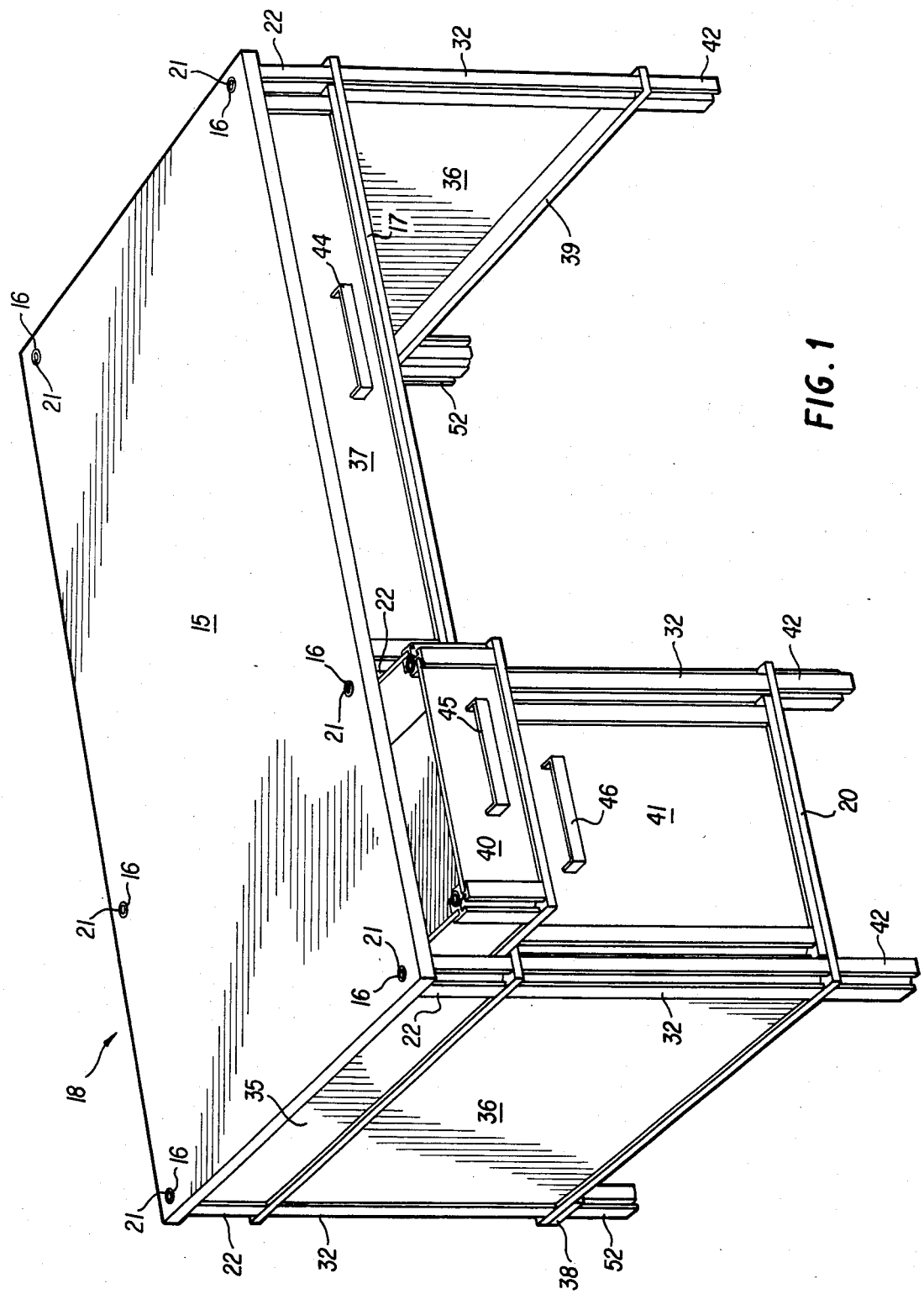
FIG. 1 is a perspective view of a typical piece of furniture, a desk, assembled in accordance with the present invention.

In FIG. 1 a desk, designated generally by reference numeral 18, comprises a horizontal member 15 which functions as of the top of the desk and which may be one inch chip board, plywood, or other suitable material which is unlikely to warp. It will be noted from FIG. 1, member 15 includes six (6) openings 16. Spaced below member 15 is a parallel further horizontal member 17 which also has openings (not seen) which correspond in position and size with openings 16. Also parallel to members 15 and 17 is a further horizontal member 20 which has openings (not seen) which are aligned with the four openings 16 on the lefthand side of the desk 14 as seen in FIG. 1.

Each opening 16 and the corresponding openings in members 17 and 20 are vertically aligned and slidably receive a post or a pipe 21 which as shown has its upper edge flush with the top of member 15.

Between members 15 and 17 are six (6) identical spacers 22, each of which has a longitudinal bore 24 which grasps the corresponding pipe 21.

As seen in FIG. 5, each bore 24 of the spacers is circular and has the same diameter as each opening 16. Spaced outboard from bore 24, a pair of grooves 25 are disposed at right angles to each other. Each groove is defined in part by an outer leg 26 and an inner leg 27 which also defines bore 24. A web 30 connects the legs and also defines, in part, bore 24. It will be noted web 30 together with legs 27 do not completely surround bore 24 and leave a gap 31 which measures about 50° of arc relative to the centerline of bore 24.

It will be understood pipes 21 extend from the level of the upper surface of member 15 to the underlying floor. As previously indicated, between members 15 and 17 are six spacers 22 which grasp their corresponding pipes 21. In a like manner, between members 17 and 20, four longer spacers 32 are provided which each grasp the corresponding pipes 21 and between member 20 and the floor are two forward spacers 42 and two rear spacers 52 (only one shown) which support member 20 and grasp the corresponding pipes 21. On the righthand side of the desk as seen in FIG. 1, two further spacers 32 (only one shown) are provided between member 17 and a side connection board 39. Finally, under board 39 and a further rear connection board 38, respectively are additional spacers 42 and 52 which grasp the righthand pipes 21, and, in consequence, support the righthand side of the desk 18. Board 38 extends across the rear of the desk 18 and has openings near its edges aligned with bores 24 in spacers 52.

Desk 18 is also provided with vertical side panels 35 and 36 which are received between members 15 and 17 and member 17 and board 39, respectively, and in grooves 25 of spacers 22 and 32, respectively. Back vertical panels, supported and held in a similar manner between the rear spacers 22 and 32 and members 15, 17 and 20 and board 38, are also provided.

If desired, a plastic floor mat may be provided for desk 18 which has openings provided to receive the six pipes 21. Such mats are usually about one quarter of an inch thick and, in such case, the lengths of the pipes should be longer by corresponding amounts.

It will be appreciated it is not necessary for pipes 16 to extend entirely through openings 16 of member 15. Bores only say about one-half the distance through the thickness of member 15 may be provided to receive the upper end of each pipe 21. Nevertheless, support for members 15, 17 and 20 and boards 38 and 39 will continue to be spacers 22, 32 and 42 rather than pipes 16 which primarily function to provide lateral stability of the spacers and to maintain them in the correct alignment. The function of the spacers is to provide support for the generally horizontal members and to align the generally vertical panels and the like. If further structural bracing is desired, this can be accomplished by drilling through legs 26 of the spacers and securing them to vertical panels such as vertical panels 36 by appropriate fasteners such as wood or metal self-tapping screws.

The spacers 22, 32, 42 and 52 are all extruded aluminum, as is pipe 21, and have identical cross-sections. Round rods of wood or other appropriate material can be substituted for pipes 21. Panels 35 and 36, the back panel and members 15, 17 and 20 may be easily fashioned from plywood using a drill and saw as the only tools. Thus, if the spacers are available, the capability exists, at most locations, to construct a desk as shown in FIG. 1 using other building and construction materials which are usually readily obtainable. Moreover, once desk 18 has been so fashioned, it can be disassembled, transported and again assembled with facility.

As will be seen in FIG. 1, desk 18 is provided with three drawers 37, 40 and 41 which are provided with handles 44, 45 and 46 of any appropriate design which can be readily obtained at most hardware stores. The specific construction of the drawers 37, 40 and 41 will be understood with reference to the embodiments shown in FIG. 2.

Figure 2:
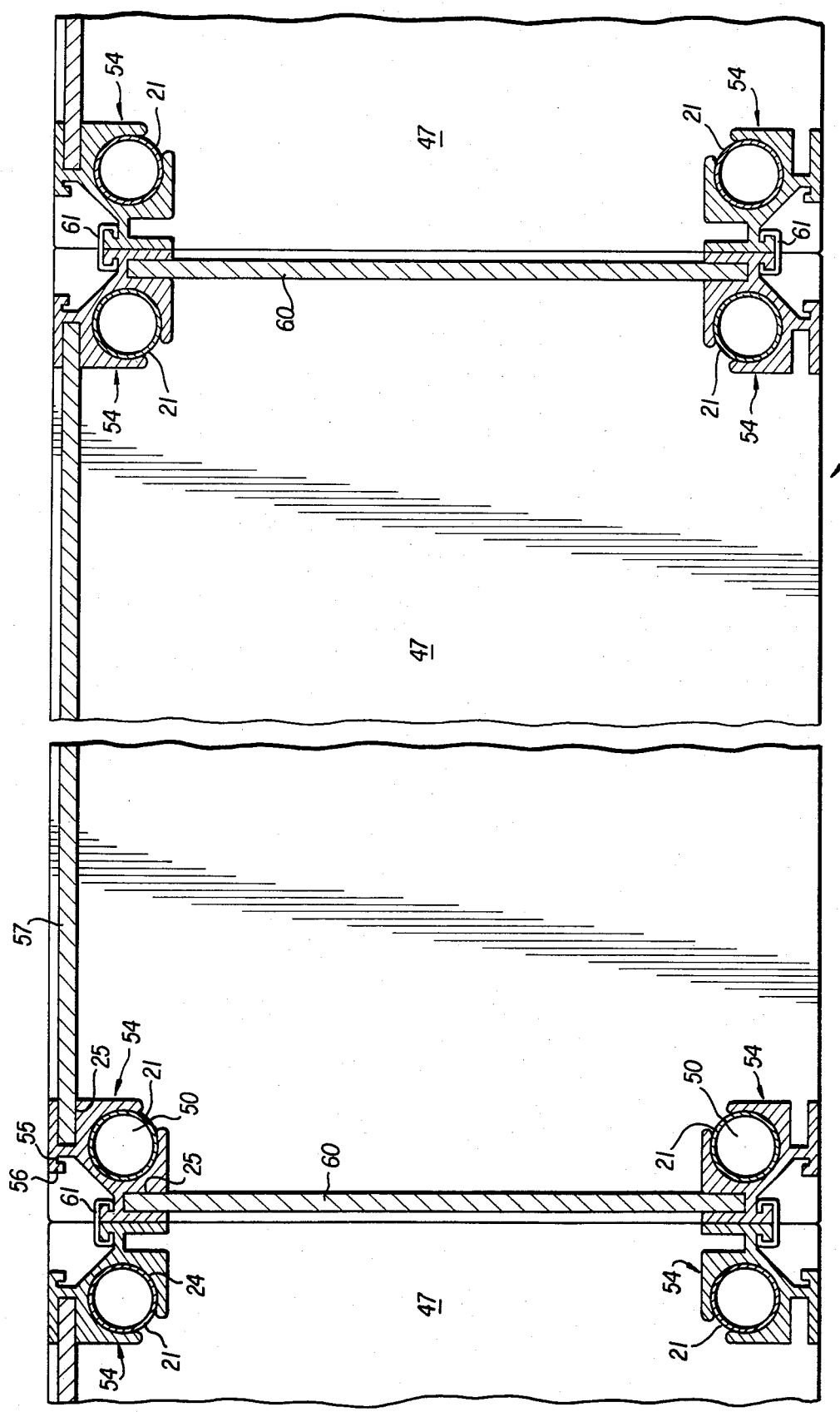
FIG. 2 is a plan view of a shelf or bookcase assembled in accordance with the invention.

A shelf of a bookcase 62 is shown in plan view in FIG. 2, wherein the shelf, per se, is designated by reference numeral 47. Such shelf 47 is preferably chip-board which is four foot in length by one foot in width by one inch in thickness and is provided with four circular openings 50 which receive vertically disposed pipes 21.

Whereas spacers 22, 32, 42 and 52 are identical in cross-section, spacer 54 as seen in FIGS. 2 and 3, is somewhat distinctive in that it is provided with a pair of clip recesses 55 which are defined by L-shaped extensions 56 which extend in directions opposite from outer legs 26. Otherwise bore 24, grooves 25, outer legs 26, inner legs 27 and webs 30 are essentially the same, as seen in cross-section, in spacer 54 as in spacers 22, 32, 42, and 52.

In shelf 47 for bookcase 62, spacers 54 are disposed about pipes 21, such spacers 54 being of equal length. A diaphragm or a panel 57, having exactly the same height as spacers 54 which receive it and otherwise appropriate dimensions to be received slideably and snugly in grooves 25 of the rearmost spacers 54, is provided. Similarily, side panels 60, which are received in grooves 25 of the right and left spacers 54, are provided, such panels 60 each having identical dimensions with their height being the same as the height of spacers 54. Preferably panel 57 constitutes one quarter inch thickness plywood which is 3'9¾" in length by twelve inches in height and the side panels 60 are also one-fourth inch plywood which are 9¾" in length and also twelve in height. It will be understood that each spacer 54 is also twelve inches in height. Similar spacers (not shown) may be aligned under the spacers 54 to provide, in effect, legs to support shelf 47 and further shelves similar to shelf 47 may be stacked above shelf 47 as seen in FIG. 2 together with further spacers 54 and panels 57 and 60. Such shelves, spacers and panels being stacked one on another for a height as predetermined by the height of the pipes 21 to form each bookcase 62.

FIG. 6 shows clips 61, also of an extruded aluminum, which are twelve inches in length or such other length as may be appropriate and are used, as indicated in FIG. 2, to connect adjacent bookcases 62 by being received in grooves 55. Although not shown, back-to-back bookcases 62 may be secured together in a similar manner by clips 61.

FIGS. 7 through 10 illustrate further extruded spacers and shelves which may be used for longer book shelves such as typical library shelving. Thus, FIG. 7 shows in cross section a midway spacer 64 which is provided with a pair of tangential opposite extending legs 65 and a pair of oppositely extending parallel legs 66 which define grooves 67 that are dimensionally similar to grooves 25. Spacer 64 also is provided with an interior bore 70 having the same diameter as bore 24 and two additional parallel legs 71, which are perpendicular to legs 65 and 66, define a groove 72 and have the same width as grooves 67 and 24.

Spacer 64 may be used in conjunction with spacers 54 of the same height and pipes 21 as shown in FIG. 8 for a shelf 74 having a length of say twelve feet, a width of one foot and six openings appropriately located whereby the outboard openings 75 receive pipes 21 surrounded by spacers 54 and the inboard openings 75 receive pipes 21 surrounded by spacers 64. In FIG. 8, the spacers 54 are not shown. It will, nevertheless, be appreciated that back panels of appropriate length may be substituted for panels 57 to be received in grooves 25 of spacers 54 and grooves 67 of spacers 64. In a manner similar to that previously described, the bookcase is constructed as high as desired by using an appropriate series of spacers, shelves, back and side panels, the six pipes 21 providing alignment of the spacers and shelves, and indirectly, the panels. Support is provided primarily by the spacers and secondarily by the shelves and panels with theback panels providing intermediate support for the shelves.

Figure 10:
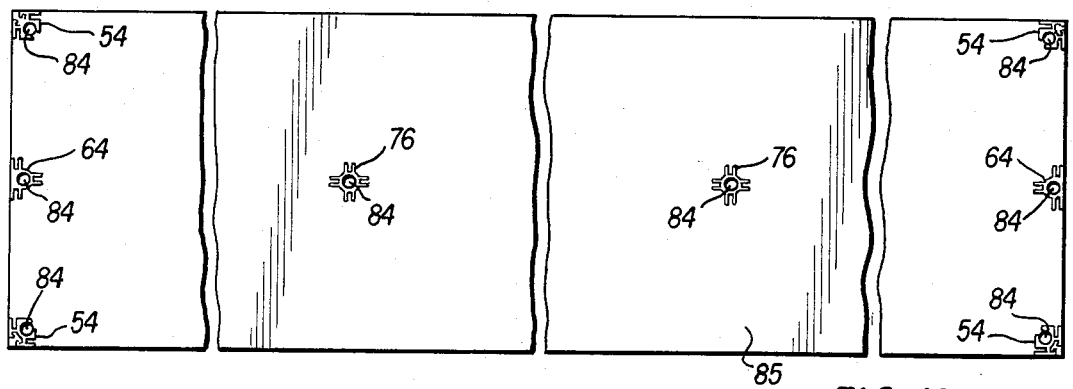
FIG. 10 is a plan view of a shelf utilizing the central spacers shown in FIG. 9.

In FIG. 9, a cross-section of a further extrusion is shown which constitutes a central spacer 76 which has two parallel sets of legs 77 extending from opposite sides to define two opposite grooves 80 which are dimensionally similar to groove 25, and two further opposite sets of legs 78, at right angles to legs 77, which define between them grooves 81 which, again, are dimensionally similar to groove 25. Spacer 76 also has a central bore 82 which has the same diameter as bore 24. As shown in FIG. 10, a shelf which may be two feet in width and twelve feet in length has eight openings 84 which are for receiving pipes 21. Spacers 54 are provided at the corners in a manner similar to that shown in FIG. 2 and along the sides between spacers 54 a pair of spacers 64 are disposed as shown. Centrally located to trisect the distance between spacers 64 are a pair of central spacers 76. All of the spacers are of the same length and side panels (not shown) are received along the width of the shelf 85 and grooves 25 and 76 in a manner comparable to that shown in FIG. 2. Similarly, central supporting vertical panels of appropriate length having the same height as the spacers are received between the grooves 72 and grooves 81 on each side of the panel and, between the central spacers 76, in the grooves 81. If desired, further spacers 64 with further openings 84 may be provided along the length on each side of shelf 85 opposite central spacers 76. Again, as with the embodiment shown in FIG. 2, the bookcases may be built by alternating shelves 85 with spacers as shown depending upon the height of the pipes 21.

Figure 12:
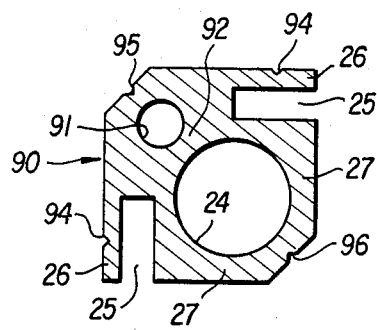
FIG. 12 is a cross-sectional view of a further modified embodiment of the spacer of the invention.

FIGS. 11 and 12 disclose alternate embodiments for the cross-section of the spacers. Thus, in FIG. 11, spacer 83 is similar to spacer 22 shown in FIG. 5 except that in legs 27, outboard grooves 87 have been provided and in outboard legs 26, there are further outboard grooves 88. The function of grooves 87 and 88 is to center drills which make holes for receiving screws, bolts or other fasteners, if desired, whereby legs 26 are fastened to panels received in grooves 25 and legs 27 are fastened to pipes 21 or such other pipes or posts which may be received in bores 24.

In FIG. 12, spacer 90 has two bores, one bore 24 having the same diameter as bore 24 in spacer 22 and a further bore 91 which has a diameter one-half of that of bore 24. In addition, gap 31 is closed whereby the inboard legs 27 are integral and together with a web 92 between bores 24 and 91 surround completely bore 24. Further, in a manner similar to that shown in FIG. 11, grooves 94 are provided in legs 26 to center drills to make openings for screws or other fasteners and further grooves 95 and 96 are provided for receiving and centering drill bits wherein it is desired to drill holes into bores 91 and 24, respectively, to secure pipes 21 or other posts or the like which may be received in bores 24.

Except for the provision to receive clips 61, extrusions having cross-sections, such as shown in FIGS. 11 and 12, may be used in lieu of spacers 22, 32, 42, 52 and 54. With a spacer 90 as shown in FIG. 12, either bore 91 or bore 24 may receive a post for alignment or both may receive same. The chief value of spacer 90 is that it tends to eliminate areas in the shelving and in the spacers which may be difficult to dust or otherwise maintain clean such as the gaps 31 and the corner indentations. In addition, the provision of two posts for bores 24 and 91 increases, somewhat, the stability of spacers 90.

Concerning the construction of the drawers 37, 40 and 41 shown in FIG. 1, it will be appreciated that the bottom of such drawer may be a single or appropriately dimensioned shelf such as shelf 47 to which is secured pipes 21 and which has not only front and side panels such as panels 57 and 60 shown in FIG. 2 but also a front panel to which handles 44, 45 and 46 are installed. The same spacer as shown in FIG. 5 with spacers corresponding in height to spacers 22 and 32 or slightly less than such spacers in height, may be used in such drawers. Preferably, the panels of such drawers are further secured by a screw or other fastening means through legs 26.

Figure 13:
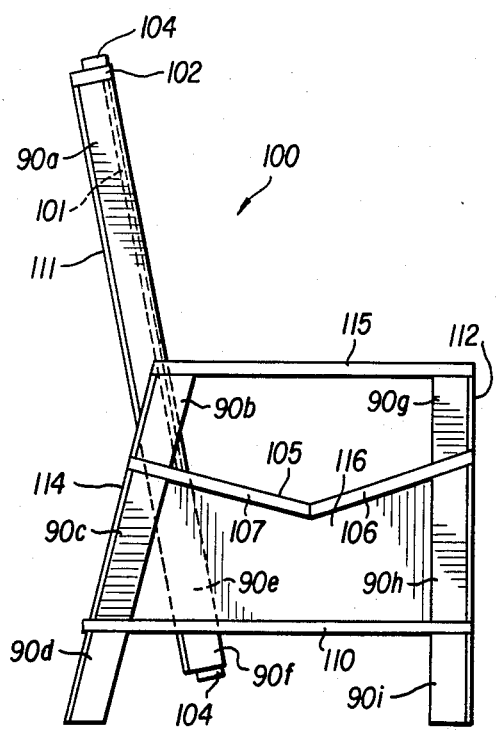
FIG. 13 is a side elevational view of a chair constructed in accordance with the invention.
Figure 14:
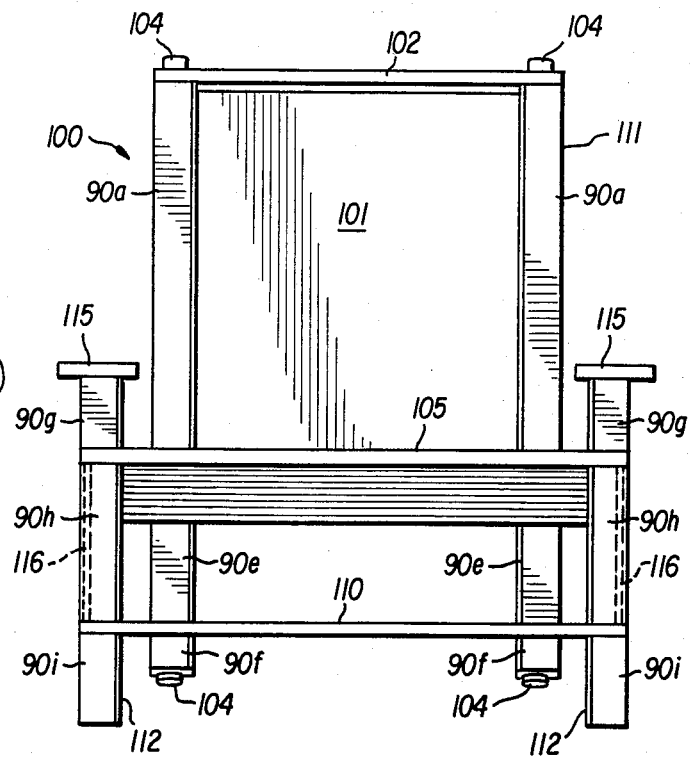
FIG. 14 is a front elevational view of the chair shown in FIG. 13.

FIGS. 13 and 14 are included to illustrate the versatility of the invention. An extruded spacer, such as extrusion 90, is not difficult to cut at the site of assembly and may, if desired, be cut at a bias. Preferably, of course, a miter box which may be set at various angles should be available.

Extrusions may be sold at desired convenient lengths to be used by an individual who desires to construct his own knock-down furniture. Thus, in FIG. 13, an extrusion such as shown in FIG. 12 is used to construct a chair 100. Such chair is provided with a wooden backrest 101, received in grooves corresponding to grooves 25 between a pair of spacers 90a. Such spacers 90a have their upper edges at right angles to their longitudinal axes and receive a connecting board 102 which has a pair of openings for the tops of the pipes 21 that are each threaded to receive cover nuts 104. At its lower edge, spacer 90a is cut at a bias to bear against a flat V-seat 105 constructed of two connected boards 106 and 107. Board 107 is provided with biased openings through which pipes 21 within spacer 90a extend therefrom and further biased-cut spacers 90e receive pipe 21 between board 107 and an underlying shelf 110. Under shelf 110 are stub spacers 90f, which have been cut to be biased on their upper edges and at right angles on their lower edges through which pipes 21 extend. Pipes 21 are again threaded on their lower ends to receive further cover nuts 104. Each set of spacers 90a, 90e and 90f together with their internal pipe 21 comprise a back support member 111.

Providing support for shelf 110 and seat 105, are a pair of front legs 112 and a pair of back legs 114. It will be noted that each back leg 114 is comprised of three spacers 90b, 90c and 90d. Spacers 90b have been cut at a bias on both edges so as to fit between seat 105 and an arm rest 115. Arm rests 115 receive the upper end of pipes 21 within back legs 114 in a manner similar to the receipt of pipes 21 by horizontal member 17 as shown in FIG. 1. The same is true with respect to pipes within front legs 112 and such pipes extend through openings in seat 105 and shelf 110. Each front leg comprises spacers 90g, 90h and 90i which have been connected with arm rests 115, seat 105 and shelf 110 in a manner similar to each back leg 114.

Side panels 116 suitably cut to accommodate the flat-V of seat 105 are received in grooves 25 of spacers 90c and 90h and extend therebetween and also between seat 105 and shelf 110, providing additional support for seat 105. Screws received in bores centered by grooves 95 or 96 connect pipes within legs 112 and 114 to surrounding spacers 90g, 90h and 90i for the front leg 112 and 90b, 90c and 90d for the back legs 114.

The resulting chair of FIGS. 13 and 14 is strong, easily repairable and so constructed that it can be subsequently disassembled or assembled with easy.

The drawings are substantially proportional. Legs 26 are 0.15 inches in width and have an outboard length of 0.83 inches. Legs 27 are 0.8 inches along their outer lengths and their thinnest width is 0.15 inches as is that of web 30. The same is true of the least thickness between grooves 25 and bore 24. The actual radius of bore 24 is 0.53 inches and the cross sectional area of spacer 22 is 1.023 square inches. The weight per foot of extrusion is 1.203 pounds.

Although the preferred embodiments of the invention have been described, it is to be understood that the inventive concepts are capable of being incorporated in other adaptations and modifications which will fall within the scope of the appended claims.

I claim:

1. A spacer for supporting a horizontal platform which comprises an upright member having a uniform cross-section throughout its length, said member defining a groove for receiving a vertical panel and an opening spaced from said groove, said opening adapted to receive a vertical post for connecting a plurality of like spacers with horizontal platforms having aligned openings receiving said vertical post, said groove defined by two planar parallel longer sides and a shorter interior end so that as seen in cross-section each side is longer than their distance apart, planes coinciding with said sides being parallel to and spaced outwardly of said opening so that they are spaced outboard of and parallel to planes tangent to said opening, and a plane generally coinciding with said interior end throughout its length projecting through about the centerline of said opening, said member defining a further like groove which is adapted to receive a further vertical panel disposed at right angles to said first mentioned vertical panel on the other side of said opening, said grooves as seen in cross-section each having uniform depths defined by said interior ends, lines connecting said interior ends of said grooves to each other and to the centerline of said opening forming substantially a right triangle with the two shorter sides of said right triangle being equal in length, said member having a plane of symmetry which contains said centerline, the outer sides of said member which define in part its periphery coinciding in part, as seen in cross-section, with the sides of a square and said plane of symmetry coinciding with the diagonal of said square, said opening being circular as seen in cross-section.

2. A spacer in accordance with claim 1, wherein said opening has a gap.

3. A spacer in accordance with claim 2, wherein said gap occupies an arc of about 50° centered from said centerline.

4. A spacer for supporting a horizontal platform which comprises an upright member having a uniform cross-section throughout its length, said member defining a groove for receiving a vertical panel and an opening spaced from said groove, said opening adapted to receive a vertical post for connecting a plurality of like spacers with horizontal platforms having aligned openings receiving said vertical post, said groove defined by two planar parallel longer sides and a shorter interior end so that as seen in cross-section each side is longer than their distance apart, planes coinciding with said sides being parallel to and spaced outwardly of said opening so that they are spaced outboard of and parallel to planes tangent to said opening, and a plane generally coinciding with said interior end throughout its length projecting through about the centerline of said opening, said member defining a further like groove which is adapted to receive a further vertical panel disposed at right angles to said first mentioned vertical panel on the other side of said opening, said grooves as seen in cross-section each having uniform depths defined by said interior ends, lines connecting said interior ends of said grooves to each other and to the centerline of said opening forming substantially a right triangle with the two shorter sides of said right triangle being equal in length, said member having a plane of symmetry which contains said centerline, the outer sides of said member which define in part its periphery coinciding in part, as seen in cross-section, with the sides of a square and said plane of symmetry coinciding with the diagonal of said square, said member defining a pair of additional grooves for receiving connecting clips adjacent said first-mentioned groove and said further groove, said additional grooves facing said opening and being inclined substantially 45° to said plane of symmetry.

5. A spacer in accordance with claim 4, wherein said member comprises an extrusion.

6. A spacer in accordance with claim 5, wherein said member is composed of aluminum.

* * * * *